(12) United States Patent
Otaka

(10) Patent No.: US 7,421,782 B2
(45) Date of Patent: Sep. 9, 2008

(54) METHOD FOR MANUFACTURING INTERNAL COMBUSTION ENGINE PISTON

(75) Inventor: Hideki Otaka, Maebashi (JP)

(73) Assignee: Riken Forge Co., Ltd., Gunma-Ken (JP)

( * ) Notice: Subject to any disclaimer, the term of this patent is extended or adjusted under 35 U.S.C. 154(b) by 383 days.

(21) Appl. No.: 11/138,783

(22) Filed: May 26, 2005

(65) Prior Publication Data

US 2005/0283976 A1    Dec. 29, 2005

(30) Foreign Application Priority Data

Jun. 28, 2004  (JP)  .............................. 2004-189686
Apr. 14, 2005  (JP)  .............................. 2005-116763

(51) Int. Cl.
  *B23P 15/10*  (2006.01)
  *B23P 15/06*  (2006.01)
  *B21K 1/14*  (2006.01)
  *F16J 15/18*  (2006.01)

(52) U.S. Cl. .............................. 29/888.04; 29/888.047; 29/888.049; 29/888.07; 29/888.072; 29/888.074; 92/165 R; 92/166

(58) Field of Classification Search .............. 29/888.04, 29/888.047, 888.049, 888.07, 888.072, 888.074; 92/186, 165 R, 166
See application file for complete search history.

(56) References Cited

U.S. PATENT DOCUMENTS

| 4,765,167 A  *  | 8/1988  | Sampson ........................ 72/68 |
| 6,763,575 B2 * | 7/2004  | Meigs et al. .................. 29/825 |
| 7,104,183 B2 * | 9/2006  | Huang ........................... 92/186 |
| 2004/0168319 A1 * | 9/2004 | Mielke ..................... 29/888.04 |

* cited by examiner

*Primary Examiner*—David P. Bryant
*Assistant Examiner*—Alexander P Taousakis
(74) *Attorney, Agent, or Firm*—Townsend & Banta

(57) ABSTRACT

A method is provided for efficiently manufacturing a high quality internal combustion engine piston having an annular cavity allowing for good circulation of cooling fluid. An annular groove is formed at the circumferential edge of the top face of a piston crown, or at the top of the exterior circumferential face of the crown, and an annular protruding strip is formed as a continuation of an edge of the opening of the annular groove. The protruding strip is bent in the direction of the opening of the annular groove by bringing to bear a pressure roller 11, while rotating the main piston body. Consequently, the opening of the annular groove is closed, whereby an annular cavity for circulating cooling fluid is formed so as to surround a pressure receiving recess.

9 Claims, 5 Drawing Sheets

METHOD FOR MANUFACTURING INTERNAL COMBUSTION ENGINE PISTON

FIELD OF THE INVENTION

The present invention relates to piston manufacturing technology, and more specifically to a method for manufacturing an internal combustion engine piston, having within the crown thereof, which is subjected to high temperatures, an annular cavity for circulating cooling fluid.

BACKGROUND OF THE INVENTION

In general, pistons used in internal combustion engines such as diesel engines and gasoline engines are made from aluminum alloys or cast iron, and when the engine is running, temperatures at the top face of the crown (the piston head) reach approximately 300° C. with aluminum pistons, and approximately 500° C. with cast iron pistons. Furthermore, ring grooves formed in the pistons for mounting piston rings also reach high temperatures when the engine is running, and in order to prevent adverse effects on the function of the piston rings, it is necessary to limit this temperature rise. For this reason, an annular cavity is commonly provided in this area for circulating a cooling fluid such as oil.

Such annular cavities can be cast using a readily disintegrating core, which is made from sand or the like, in order to form the annular cavity; but the work of molding the core, as well as disintegrating the core and removing it from the cast body after casting, is difficult, time-consuming and expensive. Furthermore, the formation of an annular cavity, by separately casting the top land and the skirt of the main piston body, and then joining the top land and the skirt at the dividing surfaces thereof, by pressure welding or the like, is known, for example, from Japanese unexamined patent application JP-2001-107803-A.

This prior method has the advantage of allowing for efficient production of the main piston body, as compared to single molded products. However, with methods such as that described in JP-2001-107803-A, when the top land and the skirt, which are two separate parts, are pressure welded, a curled scale forms at the edge of the pressure welding faces. The size of this scale is proportional to the amount of pressure applied, and if this curled scale grows very large, the volume of the annular cavity formed at the interior of the contact faces will be reduced in direct proportion to the volume of the curled scale, which adversely affects the flow characteristics of the cooling fluid, and may lead to burning of the piston head, or result in knock due to overheating the piston head.

The present invention is a reflection of the situation described above, and an object thereof is to provide a method for efficiently manufacturing a high quality internal combustion engine piston having an annular cavity allowing for good circulation of cooling fluid.

DISCLOSURE OF THE INVENTION

In order to achieve the object described above, the present invention provides a method for manufacturing an internal combustion engine piston, the piston having a structure comprising a main piston body, in which is integrally united a crown, having an exterior circumferential face on which is formed a groove for receiving a piston ring, and a skirt which is a continuation of the lower portion of the crown, the crown having a top face, on which is disposed a pressure receiving recess for forming a combustion chamber, an annular cavity for circulating cooling fluid being disposed so as to surround the pressure receiving recess; the method comprising:

forming an annular groove, for the purpose of creating the annular cavity, at the circumferential edge of the top face of the crown or at the top of the exterior circumferential face of the crown;

forming an annular protruding strip as a continuation of an edge of the opening of the annular groove; and forming the annular cavity for circulating cooling fluid so as to surround the pressure receiving recess, by applying pressure to the protruding strip, so as to bend the protruding strip in the direction of the opening of the annular groove and thereby close the opening of the annular groove.

Preferably, the protruding strip is bent in the direction of the opening of the annular groove by bringing to bear a pressure roller for applying a bending load to the protruding strip, while rotating the main piston body.

By virtue of the present invention, by forming an annular groove for the purpose of creating the annular cavity, at the circumferential edge of the top face of the crown or at the top of the exterior circumferential face of the crown, forming an annular protruding strip as a continuation of an edge of the opening of the annular groove, and forming the annular cavity for circulating cooling fluid so as to surround the pressure receiving recess, by applying pressure to the protruding strip, so as to bend the protruding strip in the direction of the opening of the annular groove and thereby close the opening of the annular groove, a high quality internal combustion engine piston having a substantially sealed annular cavity within the crown can easily be manufactured with greater efficiency as compared to conventional complex casting of the annular cavity using a core or friction welding of two parts.

Specifically, by forming the annular cavity by bending the protruding strip that is a continuation of an edge of the opening of the annular groove, no curled scale forms within the annular cavity, and consequently cooling fluid flows smoothly therein, whereby burning of the crown and knocking phenomena can be preemptively prevented.

Furthermore, by bending the protruding strip in the direction of the opening of the annular groove by bringing to bear a pressure roller for applying a bending load to the protruding strip, while rotating the main piston body, as recited in claim 2, it is possible to efficiently form the annular cavity with a uniform sectional shape along the entire length thereof.

BRIEF DESCRIPTION OF THE DRAWINGS

These and other features, aspects, and advantages of the present invention will be better understood with regard to the following description and accompanying drawings where.

DETAILED DESCRIPTION OF THE INVENTION

Figure 1:
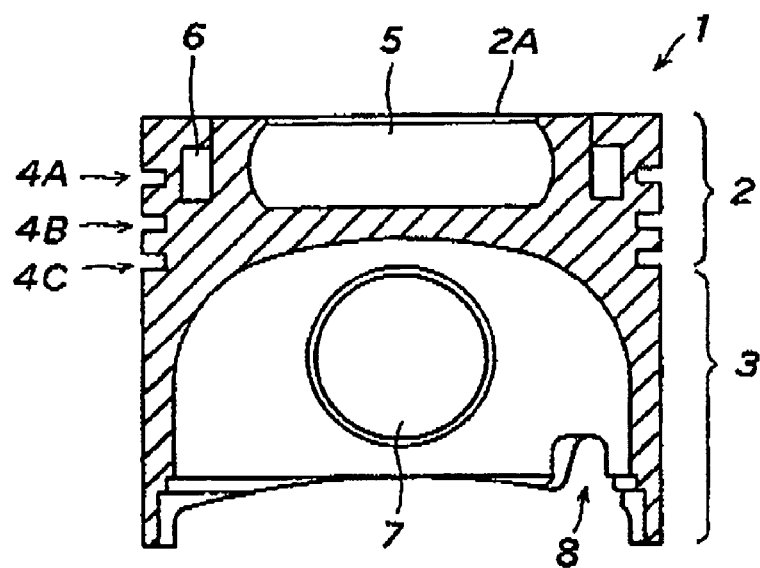
FIG. 1 is a longitudinal cross-sectional view of an internal combustion engine piston according to the present invention.

As shown in FIG. 1, reference numeral 1 indicates a cylindrical main piston body; this main piston body 1 comprises a crown 2, and skirt 3 as a continuation of the lower portion thereof, and is formed as a single integrated body by processes such as forging, casting and cutting. Three continuous grooves 4A, 4B and 4C (ring grooves) are formed in the circumferential direction at the exterior circumferential face of the crown 2, with predetermined interval therebetween in the axial direction, each of the grooves 4A to 4C being so constructed as to receive a piston ring not shown in the drawing.

Furthermore, in the central region of the top face 2A (piston head) of the crown 2, is formed a pressure receiving recess 5, which forms a combustion chamber with a cylinder head (which is not shown in the drawings), this pressure receiving recess 5 being so constructed as to allow fuel to be injected therein. In particular, an annular cavity 6 is formed so as to surround the pressure receiving recess 5 in the crown 2. This annular cavity 6 is filled with cooling fluid (in this embodiment, oil) and this cooling fluid flows within the annular cavity 6 so as to circulate between the annular cavity and an oil cooler not shown in the drawing. Meanwhile, the skirt 3 is the area below the bottommost groove 4C. As the name suggests, this section is hollow, and a pin hole 7 is formed in the circumferential wall thereof, through which passes a piston pin (not shown in the drawings). The piston pin which is inserted therethrough connects one end of a connecting rod (not shown in the drawings).

Note that a cutaway 8, allowing for the passage of a conduit (not shown in the drawings), is formed at the edge of the lower opening of the skirt 3. The conduit that passes therethrough serves to supply cooling fluid to the interior of the annular cavity 6 and to evacuate cooling fluid from the annular cavity 6. Note that, with the exception of the part that is connected with this conduit, the annular cavity 6 shown in FIG. 1 is a sealed hollow space.

Hereinafter, a method of manufacturing a piston such as described above is set forth. First, a main piston body 1 is produced in the form shown in FIG. 2. That is to say, by processes such as forging, casting and cutting, a main piston body 1 is formed as an integrated structure comprising a crown 2 and a skirt 3. In particular, an annular groove 9 is formed surrounding the pressure receiving recess 5, so as to ultimately form the annular cavity 6, such as described above; and an annular protruding strip 10 is formed as a continuation of an edge of the opening of this annular groove 9.

With this unfinished main piston body 1, such an annular cavity 6 can easily be molded by casting, without using complex cores, or can be easily fabricated by processes such as forging or cutting.

Figure 2:
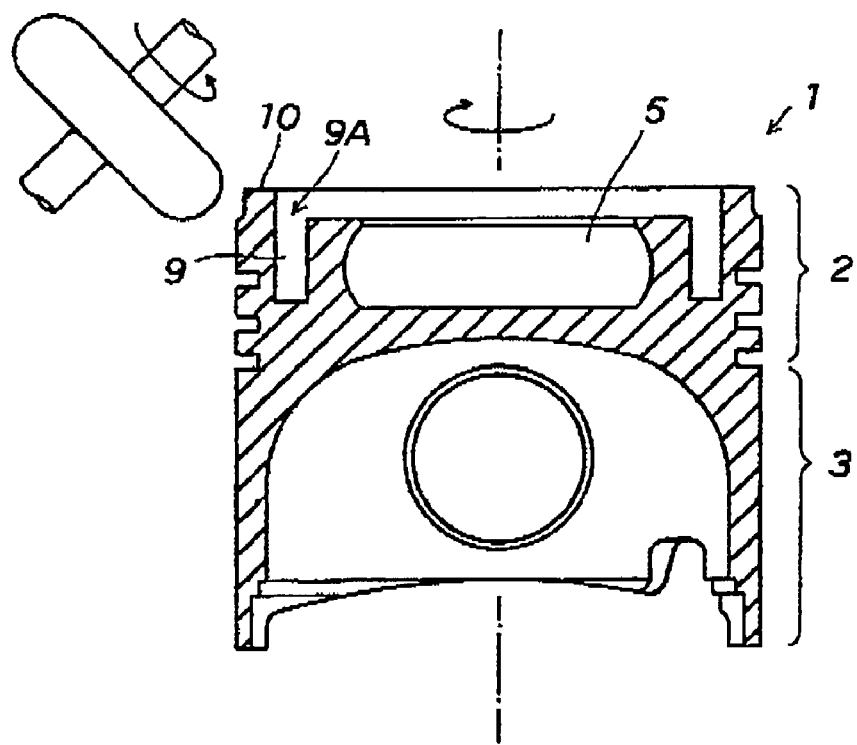
FIG. 2 is a longitudinal cross-sectional view of the main piston body of the present invention prior to forming the annular cavity therein.

Note that, as shown in FIG. 2, the annular groove 9 is formed at the circumferential edge of the top face 2A of the crown 2, so as to open upwards, while the protruding strip 10 is formed along the outside edge of the opening of the annular groove 9. However, the present invention is not limited to such a construction, and as described below, the annular groove 9 may be formed at the top of the exterior circumferential face of the crown 2, so as to be open to the side.

Figure 3:
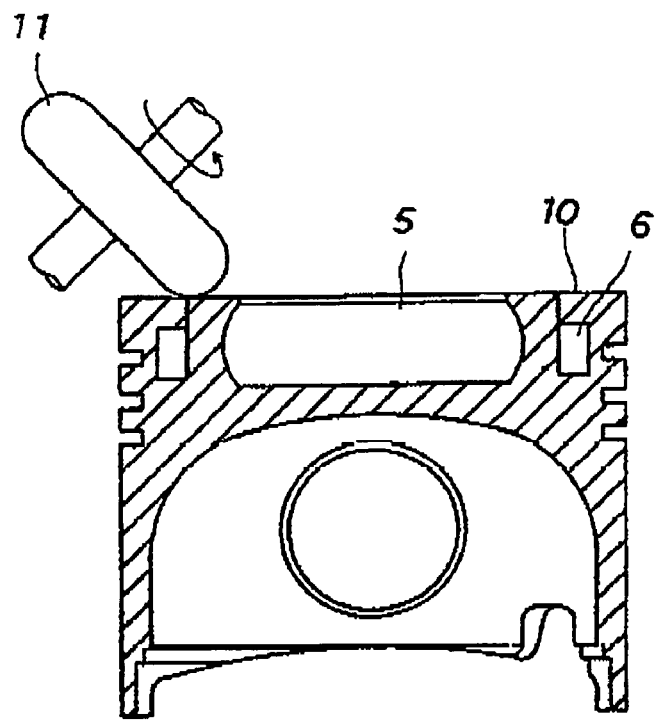
FIG. 3 is a longitudinal cross-sectional view showing the main piston body of the present invention after forming the annular cavity therein.

FIG. 3 illustrates the situation in which the opening 9A of the annular groove 9 has been closed, completing the annular cavity 6. As can be understood from FIG. 3, in order to close the opening 9A of the annular groove, a rotationally driven pressure roller 11 is brought to bear on the protruding strip 10, while the main piston body 1 is rotated on its own axis, so as to apply pressure to the protrusion from a direction perpendicular to the lateral face thereof, in the direction of the opening 9A of the annular groove. Consequently, a bending load is applied to the protruding strip 10 by the pressure roller 11, and the protruding strip 10 is bent in the direction of the opening 9A of the annular groove. Thus, the opening 9A of the annular groove is closed by the bent protruding strip 10, so as to form the annular cavity 6 described above, surrounding the pressure receiving recess 5. Therefore, by virtue of the present invention, an annular cavity 6 can easily be formed without dividing the main piston body into two parts, or using complicated cores, as was done conventional.

Figure 4:
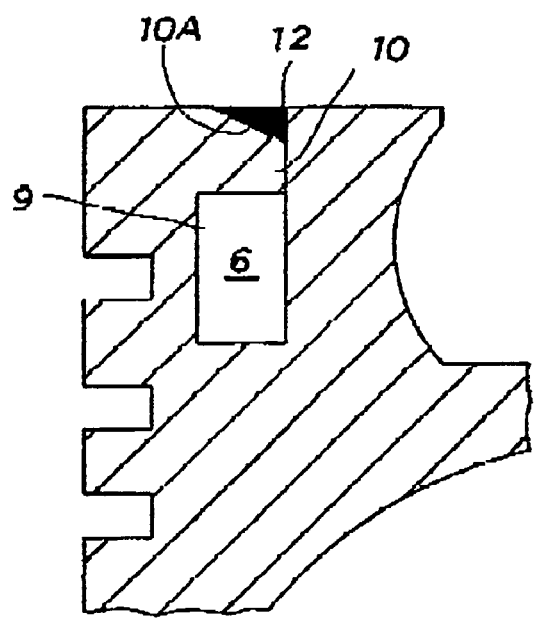
FIG. 4 is a partial cross-sectional view of the main piston of the present invention, illustrating the area in which the annular cavity is formed.

Note that, after bending the protruding strip 10, it is preferable that the joint 12 between the end face of the protruding strip 10 and the inner wall of the annular groove 9 be welded as shown in FIG. 4. In this manner, it is possible to prevent all risk of cooling fluid (such as oil) leaking out from the joint 12. Furthermore, in welding the joint 12, a bevel 10A, such as shown in FIG. 4, may be formed beforehand at the end of the protruding strip 10, so as to form a bevel groove for welding at the joint 12, but formation of the bevel groove may be omitted if electron beam welding or the like is used.

Figure 5:
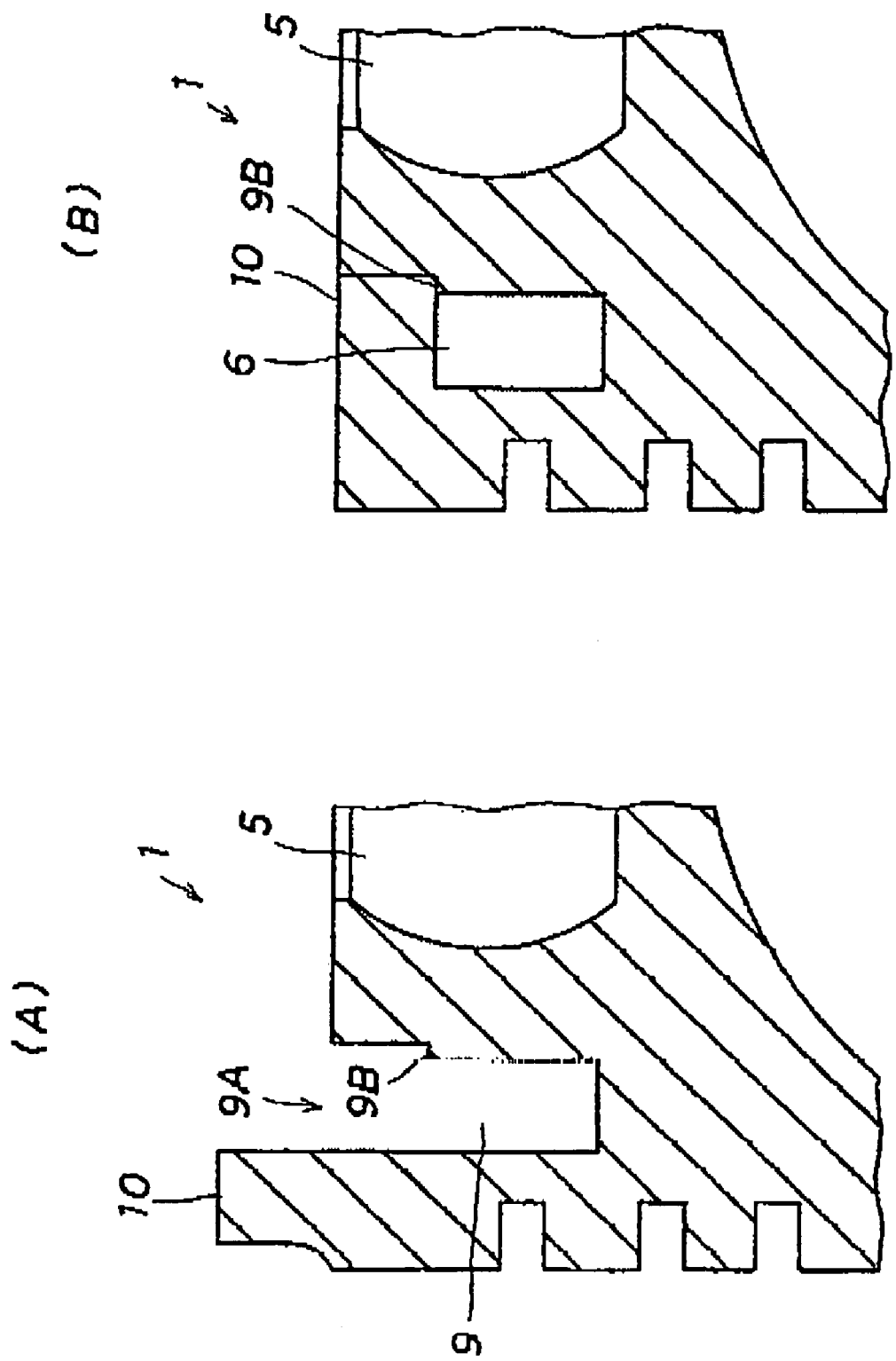
FIG. 5(A) is a partial cross-sectional view of the main piston of the present invention, illustrating a variant annular groove.
FIG. 5(B) is a partial cross-sectional view of the main piston of the present invention, illustrating the situation in which the opening of the annular groove shown in FIG. 5(A) has been sealed.

Furthermore, as shown in FIG. 5(A), it is preferable that a ledge 9B be formed beforehand in the side wall of the annular groove 9 that faces the protruding strip at the opening 9A of the annular groove 9 (the inner wall) in the main piston body 1. In this manner, as shown in FIG. 5(B), when the protruding strip 10 is bent, the end of the protruding strip 10 fits tightly against the ledge 9B, allowing for better sealing of the resulting annular cavity 6.

In the foregoing, suitable embodiments of the present invention have been described, but the present invention is not limited to the embodiments described above, and the protruding strip 10 can be bent using a press or a hammer, without rotating the main piston body 1. Furthermore, in the embodiments described above, the annular groove 9 is formed at the peripheral edge of the top face 2A (piston head) of the crown 2, and the protruding strip 10 is provided as a continuation of the outside edge of the opening, but these may also be disposed according to the following modes of embodiment.

Figure 6:
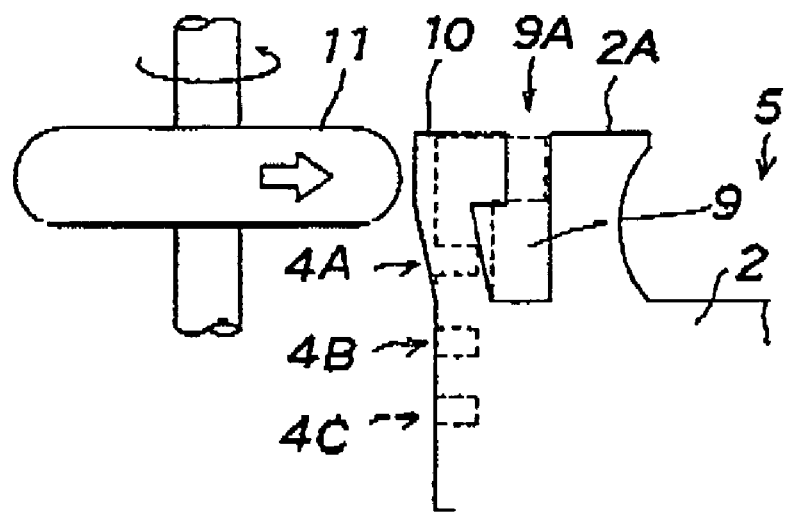
FIG. 6 is an cross-sectional view of the main piston of the present invention, illustrating an optional embodiment of formation of the annular cavity.
Figure 7:
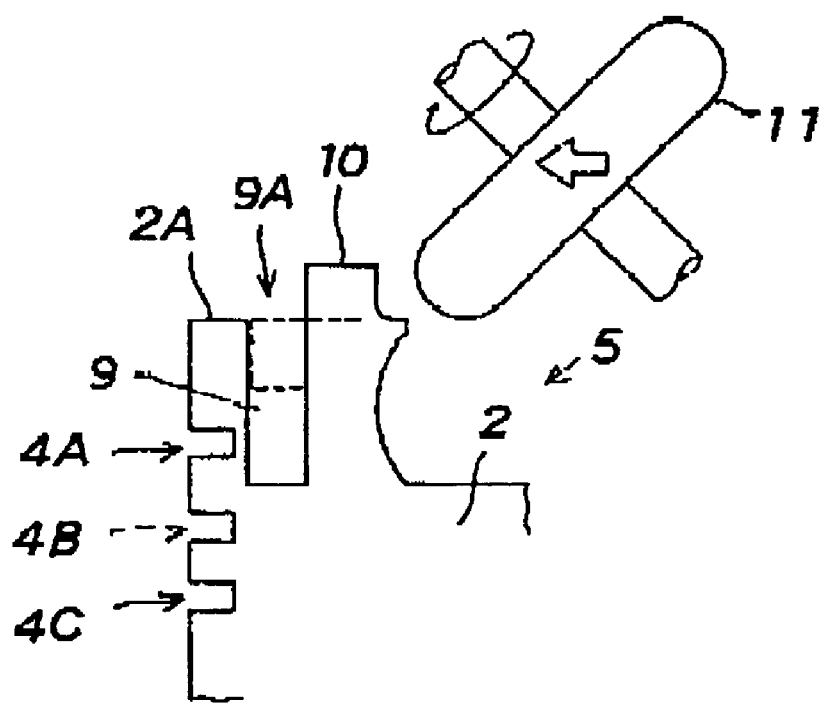
FIG. 7 is a cross-sectional view of the main piston of the present invention, illustrating an optional embodiment of formation of the annular cavity.
Figure 8:
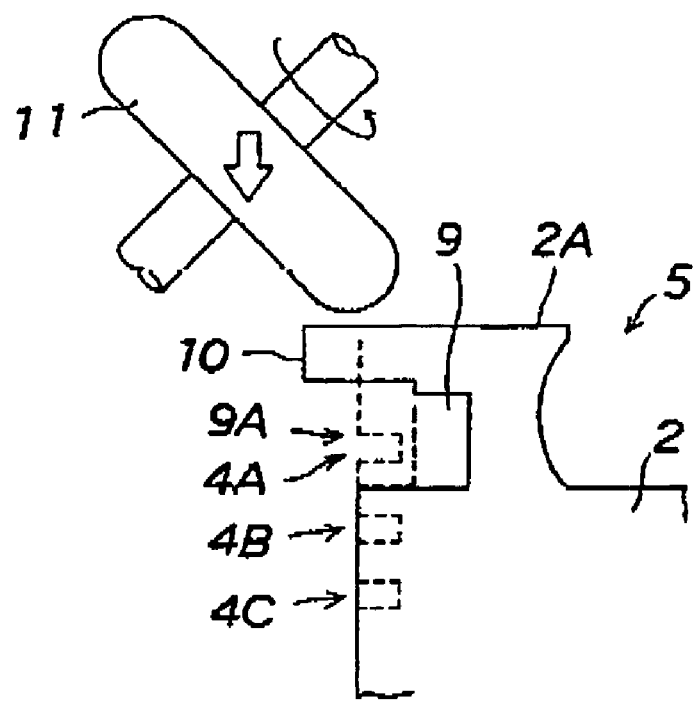
FIG. 8 is a cross-sectional view of the main piston of the present invention, illustrating an optional embodiment of formation of the annular cavity.
Figure 9:
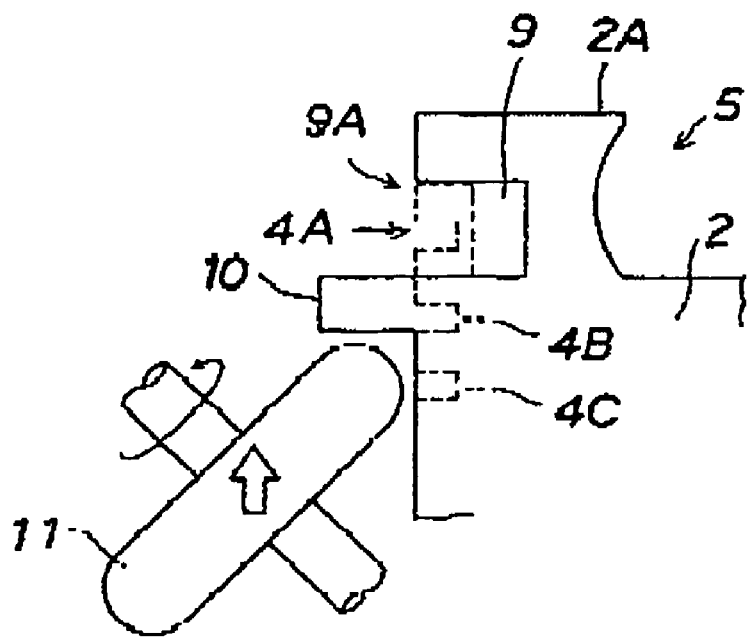
FIG. 9 is a cross-sectional view of the main piston of the present invention, illustrating an optional embodiment of formation of the annular cavity.

FIG. 6 illustrates a variant of the protruding strip 10. FIG. 7 illustrates an embodiment of the main piston of the present invention wherein the annular groove 9 is formed in the piston head 2A, and the protruding strip 10 is formed as a continuation of the inside edge of the opening thereof. FIG. 8 and FIG. 9 illustrate embodiments of the main piston of the present invention wherein the annular groove 9 is formed as a side opening in the top of the exterior circumferential face of the crown 2. As in the embodiments described above, the protruding strip 10 can be bent using a pressure roller 11 or the like, and the opening 9A of the annular groove 9 can likewise be closed so as to form an annular cavity 6, as shown in FIG. 1.

Note that, in the embodiments shown in FIG. 6, FIG. 8 and FIG. 9, the uppermost groove 4A can be formed beforehand on the exterior circumferential face of the protruding strip 10, but in order to avoid defects in the shape of the grooves 4A to 4C as a result of plastic deformation caused by applying pressure to the protruding strip 10, it is preferable that, after forming the annular cavity 6 by bending the protruding strip 10, the groove 4A on the exterior circumferential side of the bent protruding strip 10, and the grooves 4B and 4C therebelow, be successively formed by cutting, whereby the grooves 4A to 4C can be machined to a suitable shape, while advantageously cooling the top land adjacent to the annular cavity 6.

Furthermore, in the variants shown in FIG. 6 to FIG. 9, it is likewise preferable that, at the side wall of the annular groove 9, which faces the protruding strip 10 at the opening of 9A of the annular groove 9, a ledge be formed beforehand (in FIG. 6 to FIG. 9, this ledge is not illustrated) so that the end of the bent protruding strip 10 fits tightly thereagainst.

What is claimed is:

1. A method for manufacturing an internal combustion engine piston, the piston comprising a main cylindrical piston body, said main cylindrical body comprising:
   (i) a crown having:
      a top face having a circumferential edge disposed therearound;
      a pressure receiving recess formed within the crown, adjacent the top face thereof;
      an exterior circumferential face disposed adjacent the circumferential edge of the top face;
      an annular cavity for circulating cooling fluid disposed within the crown, between the pressure receiving recess and the exterior circumferential face, so as to encircle said pressure receiving recess;
      one or more grooves formed in the circumferential face for receiving a piston ring; and
      a lower portion formed integral with the exterior circumferential face, and
   (ii) a skirt, said skirt formed integral with and being a continuation of the lower portion of said crown;
   said method comprising:
   (a) forming an annular groove opening, for the purpose of creating said annular cavity, in the top face of the crown, between the circumferential edge of said top face of the crown and the pressure receiving recess disposed in said crown, thereby forming an annular groove having an inner wall in the crown between the pressure receiving recess and the exterior circumferential face, and an annular protruding strip having an end face defined by the top face of the crown between the annular groove and the exterior circumferential face, said annular protruding strip being formed integral with the top face and circumferential edge; and
   (b) applying pressure to said annular protruding strip, so as to bend said annular protruding strip in a direction of the annular groove, so as to close the annular groove opening, thereby forming an annular cavity operable to circulate cooling fluid.

2. The method of manufacturing an internal combustion engine piston of claim 1, wherein, in step (b), a pressure roller is brought to bear upon the annular protruding strip, so as to apply a bending load to said annular protruding strip, while simultaneously rotating said main piston body.

3. The method of manufacturing an internal combustion engine piston of claim 1, further comprising:
   (c) welding the end face of the annular protruding strip to the inner wall of the annular groove, so as to seal the annular cavity.

4. The method of manufacturing an internal combustion engine piston of claim 1, further comprising:
   (c) forming a bevel in the annular protruding strip, adjacent the annular groove, so as to create a bevel groove in the annular protruding strip; and
   (d) welding the annular protruding strip to the inner wall of the annular groove, adjacent the bevel groove, so as to seal the annular cavity.

5. A method for manufacturing an internal combustion engine piston, the piston comprising a main cylindrical piston body, said main cylindrical body comprising:
   (i) a crown having:
      a top face having a circumferential edge disposed therearound;
      a pressure receiving recess formed within the crown, adjacent the top face thereof;
      an exterior circumferential face disposed adjacent the circumferential edge of the top face;
      an annular cavity for circulating cooling fluid disposed within the crown, between the pressure receiving recess and the exterior circumferential face, so as to encircle said pressure receiving recess;
      one or more grooves formed in the circumferential face for receiving a piston ring; and
      a lower portion formed integral with the exterior circumferential face, and
   (ii) a skirt, said skirt formed integral with and being a continuation of the lower portion of said crown;
   said method comprising:
   (a) forming an annular groove opening, for the purpose of creating said annular cavity, in the top face of the crown, between the circumferential edge of said top face of the crown and the pressure receiving recess disposed in said crown, thereby forming an annular groove having an inner wall in the crown between the pressure receiving recess and the exterior circumferential face, and an annular protruding strip having an end face defined by the top face of the crown between the annular groove and the exterior circumferential face, said annular protruding strip being formed integral with the top face and circumferential edge;
   (b) forming a ledge in the inner wall of the annular groove, opposite the annular protruding strip;
   (c) applying pressure to said annular protruding strip, so as to bend said annular protruding strip in a direction of the ledge formed in the inner wall of the annular groove, such that the end face of the annular protruding strip intersects, rests against, or is disposed adjacent to the ledge formed in the inner wall of the annular groove.

6. The method of manufacturing an internal combustion engine piston of claim 5, further comprising:
   (d) welding the end face of the annular protruding strip to the inner wall of the annular groove, so as to seal the annular cavity.

7. The method of manufacturing an internal combustion engine piston of claim 5, further comprising:
   (d) forming a bevel in the annular protruding strip, adjacent the annular groove, so as to form a bevel groove in the annular protruding strip; and
   (e) welding the annular protruding strip to the inner wall of the annular groove, adjacent the bevel groove, so as to seal the annular cavity.

8. A method for manufacturing an internal combustion engine piston, the piston comprising a main cylindrical piston body, said main cylindrical body comprising:
   (i) a crown having:
      a top face having a circumferential edge disposed therearound;
      a pressure receiving recess formed within the crown, adjacent the top face thereof;
      an exterior circumferential face disposed adjacent the circumferential edge of the top face;
      an annular cavity for circulating cooling fluid disposed within the crown, between the pressure receiving recess and the exterior circumferential face, so as to encircle said pressure receiving recess;
      one or more grooves formed in the circumferential face for receiving a piston ring; and
      a lower portion formed integral with the exterior circumferential face, and
   (ii) a skirt, said skirt formed integral with and being a continuation of the lower portion of said crown;
   said method comprising:
   (a) forming an annular groove opening, for the purpose of creating said annular cavity, in the top face of the crown and exterior circumferential face, between the circumferential face of the crown and the pressure receiving recess disposed in said crown, thereby forming an annular groove having an inner wall in the crown between the pressure receiving recess and the exterior circumferential face, and an annular protruding strip having a side wall integral with a portion of the inner wall of the annular groove opposite the exterior circumferential face, and an end face defined by the top face of the crown and formed integral with and continuous to the inner wall of the annular groove opposite the exterior circumferential face between the annular groove and the exterior circumferential face; and
   (b) applying pressure to said annular protruding strip, so as to bend said annular protruding strip in a direction of the exterior circumferential face, such that the side wall of the annular protruding strip intersects, rests against, or is disposed adjacent to the top face of the crown between the exterior circumferential face and the annular groove, thereby forming an annular cavity.

9. The method of manufacturing an internal combustion engine piston of claim 8, further comprising:
   (d) welding the side wall of the annular protruding strip to the top face of the crown between the exterior circumferential face and the annular groove, so as to seal the annular cavity.

* * * * *